United States Patent [19]

Mamish et al.

[11] Patent Number: 5,681,654
[45] Date of Patent: Oct. 28, 1997

[54] LOW-FOGGING PRESSURE-SENSITIVE ADHESIVE

[75] Inventors: Abboud L. Mamish, Natick, Mass.; Stephanie L. M. Laurin, Pelham, N.H.

[73] Assignee: The Kendall Company, Mansfield, Mass.

[21] Appl. No.: 567,086

[22] Filed: Dec. 4, 1995

[51] Int. Cl.[6] .................................................. C09J 7/02
[52] U.S. Cl. ........................... 428/354; 428/355 BL
[58] Field of Search ........................ 428/354, 355, 428/261

[56] References Cited

U.S. PATENT DOCUMENTS

| | | | |
|---|---|---|---|
| 3,973,563 | 8/1976 | Green | 128/156 |
| 4,303,724 | 12/1981 | Sergeant | 428/354 |
| 4,346,700 | 8/1982 | Dunshee | 128/155 |
| 4,992,331 | 2/1991 | DeCoste | 428/354 |
| 4,997,709 | 3/1991 | Huddleston | 428/355 |
| 5,169,890 | 12/1992 | Eadara et al. | |
| 5,190,989 | 3/1993 | Himori | |
| 5,242,727 | 9/1993 | Briddell | 428/355 |
| 5,273,798 | 12/1993 | Miner | |
| 5,504,136 | 4/1996 | Davis | 524/490 |

*Primary Examiner*—Jenna Davis
*Attorney, Agent, or Firm*—David J. Koris

[57] ABSTRACT

Adhesives, particularly pressure sensitive adhesives, and adhesive tapes, e.g., harness tapes, that exhibit low-fogging characteristics. The adhesive is a cured composition of an elastomer and a cure system including a sulfur-containing and a zinc-based curing agent.

25 Claims, 1 Drawing Sheet

LOW-FOGGING PRESSURE-SENSITIVE ADHESIVE

FIELD OF THE INVENTION

This invention relates to pressure-sensitive adhesives.

BACKGROUND OF THE INVENTION

Pressure-sensitive adhesives are made of elastomeric compositions that flow sufficiently on the application of low stress to wet and thus attach to an adherend. The compositions are usually based on elastomers, and typically include viscosity enhancers, tackifiers, antioxidants, fillers, and other constituents. These adhesives have numerous uses including, for example, in adhesive tapes which are common in both household and industrial applications. One important industrial application is a harness tape, which is used to wrap irregular surfaces, such as instrument panel wires in automobiles and other vehicles. Accordingly, harness tapes must be highly flexible and conformable, generally liquid impermeable, chemical resistant, flame resistant, and non-corrosive.

Harness tapes used in automobile interiors should also exhibit low-fogging characteristics. Fogging refers to outgassing of constituents which can condense on a windshield or instrument read-outs, obscuring an operator's view. Automotive manufacturers have specified that components within the operator compartment have a Fogging Number of 60 or above as measured by Ford Laboratory Test Method BO-116-3 (incorporated infra).

SUMMARY OF THE INVENTION

The invention features adhesives and tapes, such as harness tapes, that have low-fogging characteristics. Low-fogging is achieved by proper selection of the adhesive constituents and the cure conditions as described below. For example, the adhesive compositions may include constituents that contribute to beneficial performance properties and have relatively low-fogging when measured neat in the amounts present but collectively produce relatively high fogging prior to cure or when cured under most conditions. However, by using cure systems and constituents as described herein, high performance, low-fogging adhesives can be produced with properties suitable for use with, for example, harness tapes.

Percentage given herein are by weight unless otherwise noted or apparent. The acronym "phr" refers to parts per hundred of elastomer by weight, unless otherwise noted or apparent.

In a particular aspect, the invention features a low-fogging adhesive or a harness tape which includes a backing, a reinforcing layer, and a pressure-sensitive adhesive. The adhesive is a cured composition of an elastomer including isoprene, a cohesion enhancer, a tackifier and a cure system. The cure system is a zinc-containing curing agent, thiuram present at about 0.15 phr or more, and thiazole present at about 0.5 phr or more. The thiuram and the thiazole are present in a ratio of about 1:3. The elastomer, cohesion enhancer, and tackifier have Fogging Numbers of about 60 or more when measured neat in the amounts present in the composition. The adhesive and/or the tape have a Fogging Number of about 50 or more following cure of the adhesive.

Embodiments may also include one or more of the following. The harness tape or adhesive has a Fogging Number of about 60, 80, or 90 or more following cure. The thiuram is present of about 0.3 phr or more and the thiazole accelerator is present at about 1.0 phr or more. The thiuram accelerator is present in a range of at about 0.3 to 0.45 phr and the thiazole is present in the range of about 1.0 to 1.5 phr. The thiuram is methyl tuads. The thiazole and zinc are provided as a zinc-thiazole complex. The curing agent is zinc 2-mercaptobenzothiazole.

Embodiments may also include one or more of the following. The elastomer is a natural or synthetic rubber. The cohesion enhancer is polyolefin, e.g., polyethylene. The tackifier is a hydrocarbon resin. The adhesive includes a filler having a Fogging Number of about 60 or above when measured neat in the amounts present. The filler is clay. The adhesive includes an organic antioxidant exhibiting a Fogging Number of about 60 or more when measured neat in an amount present in the adhesive. The adhesive includes flame retardant exhibiting a Fogging Number of about 60 or above when measured neat in an amount present in the adhesive.

Embodiments may also include one or more of the following. The harness tape exhibits unwind of about 20 to 50 ounces. The harness tape exhibits adhesion to backing of about 25 to 50 ounces. The harness tape exhibits tensile strength of about 15 to 30 lbs/width-inch. The harness tape exhibits flexural stiffness of about 100 to 200 mg.cm. The harness tape exhibits fluid imperviousness and is flame retardant.

In another aspect, the invention features a pressure-sensitive adhesive that is a cured composition of an elastomer and a cure system including a sulfur-containing accelerator and a zinc curing agent. The adhesive has a Fogging Number of about 60 or more following cure.

In another aspect the invention features a low-fogging harness tape, which includes a backing layer, a reinforcing member, and an adhesive. The adhesive is a cured composition of an elastomer, including isoprene, and a cure system of a sulfur-containing accelerator and a zinc-containing curing agent. The adhesive has a Fogging Number of about 60 or more following cure and the tape exhibits unwind of about 20 to 50 ounces.

In another aspect, the invention features a method for forming a low-fogging pressure-sensitive adhesive that includes providing an elastomer providing a cure system comprised of a sulfur-containing accelerator, curing agent, and zinc and controlling the level and/or ratio of the sulfur-containing accelerator, curing agent and zinc to provide a cured adhesive having a Fogging Number of about 50 or more. The invention also includes products formed by the processes described herein.

Embodiments may also include one or more of the following. The amount of the accelerator and curing agent is controlled to produce a low fogging adhesive. The amount of accelerator may be about 0.15 phr or more, preferably about 0.15 to 0.45 phr, more preferably about 0.3 phr. The amount of curing agent is about 0.5 phr or more, preferably in the range of about 0.5 to 1.5 phr, more preferably about 1.0 phr. The phr ratio of accelerator to curing agent is controlled to produce a low fogging adhesive. The ratio of accelerator to curing agent is about 1:3.

Embodiments may also include one or more of the following. The curing agent is zinc or zinc oxide. The curing agent includes an accelerator. The curing agent includes a thiazole. The thiazole is present in the same amount as zinc. The thiazole is a zinc-thiazole complex. The curing agent is zinc mercaptobenzothiazole. The cure system includes a disulfide accelerator. The cure system includes a thiuram. The thiuram is methyl tuads.

Embodiments may also include one or more of the following. The elastomer has a Fogging Number of about 60 or more when measured neat in an amount present in the adhesive. The isoprene elastomer is present at about 70 to 80 phr of the adhesive. The elastomer is a natural or synthetic rubber. The adhesive includes tackifier, filler, and cohesion enhancer constituents, wherein the constituents each have a Fogging Number of about 60 or above when measured neat in amounts present in the adhesive. The tackifier is a hydrocarbon resin. The cohesion enhancer is polyolefin. The filler is a clay. The adhesive includes an organic antioxidant exhibiting a Fogging Number of about 60 or more when measured neat in an amount present in the adhesive. The adhesive includes a flame retardant exhibiting a Fogging Number of about 60 or above when measured neat in an amount present in the adhesive. The adhesive has a Fogging Number of about 80 or more following cure. The adhesive has a Fogging Number of about 90 or more following cure.

Further aspects, features, and embodiments follow. For example, further discussion of the types and amounts of constituents suitable are provided herein.

DETAILED DESCRIPTION OF THE INVENTION

Figure 1:
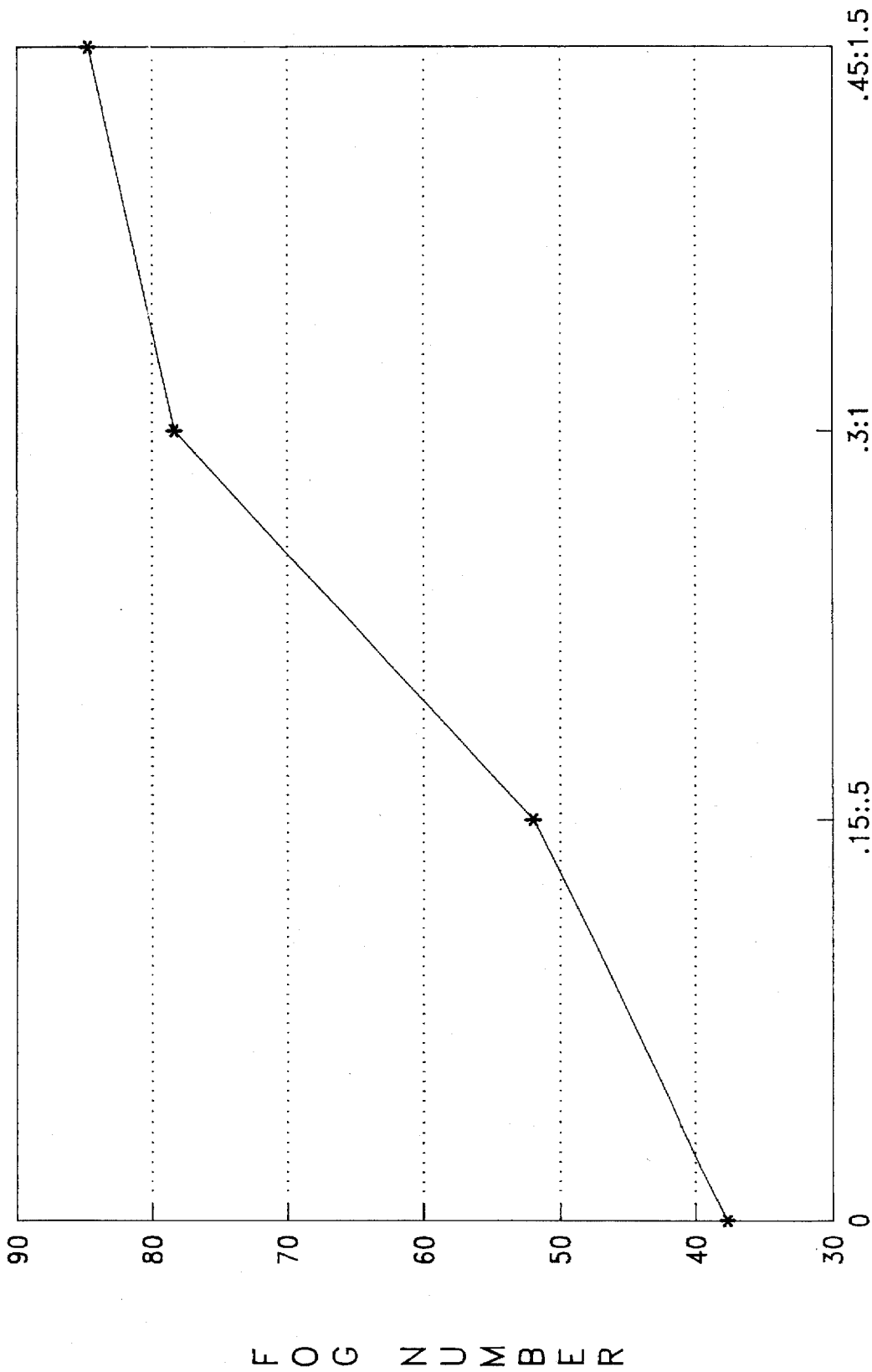

We first briefly describe the drawing.

Drawings FIGURE 1 is a graph of Fogging Number as a function of adhesive cure system for a series of harness tapes.

COMPOSITION

Preferred adhesives are cured compositions of an isoprene-based elastomer and a cure system including a sulfur-based accelerator and zinc. Embodiments may also include cohesion enhancer, tackifier, filler, antioxidant and/ or flame retardant. After cure, the adhesive has a Fogging Number of about 50 or more, preferably 60 or 75 or more, or even 90 or more, e.g., about 90–100. In particular embodiments, the adhesive is a component of a low-fogging harness tape with a Fogging Number in the ranges above.

The isoprene elastomer contributes to the adhesive properties. The preferred adhesives include elastomer of about 30 to 50 phr, e.g., about 40 phr of the adhesive. Preferably the isoprene elastomer is about 60 to 90, more preferably 70 to 80 phr of the total of elastomer, plus cohesion enhancer. In the uncured state, preferred elastomers exhibit a Fogging Number of about 60 or more when measured neat in the amount present in the adhesive. Suitable elastomers include natural rubbers (e.g., Sir 10, available from Alcan Rubber, New York, N.Y.) and synthetic polyisoprenes (e.g., Natsyn, available from Goodyear Tire and Rubber, Akron, Ohio) and mixtures thereof. Isoprene elastomers are particularly advantageous for use in harness tape applications due to the unwind and other properties they provide in the adhesive. Non-isoprene elastomers can be mixed with isoprene elastomers to modify adhesive properties. For example, reclaimed rubber can be added to change the color and thermoplastic rubbers can be used to improve aging characteristics. Preferred non-isoprene elastomers exhibit a Fogging Number of about 60 or more when measured neat in the amount present in the adhesive. Examples include reclaimed rubber (e.g., High Mooney Butex available from U.S. Rubber Reclaiming) and thermoplastic rubbers such as SIS rubbers (e.g., Kraton 1107 or 1101, available from Shell Chemical Co., Houston, Tex.) and butyl rubbers (e.g., Butyl 268, available from Exxon, Houston, Tex.).

The cure system effects the cure in a manner that produces a low-fogging adhesive. Without being limited to a theory, it is believed that the cure system produces a cure that chemically crosslinks or mechanically traps constituents that would otherwise volatilize and cause fogging. In addition, it is believed that the cure does not produce low molecular weight by-products or traps these by-products within the cured adhesive. The cure system includes a sulfur-containing accelerator and zinc in sufficient absolute and relative amounts to produce low-fogging characteristics in the adhesive, as described in the Summary and further below in the Examples. Suitable accelerators include disulfides, preferably thiurams. A preferred example is methyl tuads (tetramethylthiuram disulfide available from R.T. Vanderbilt, Norwalk, Conn.). Preferably, the methyl tuads is added as a mixture with a minor amount (e.g. about 3.0 phr or less) of ethylene-propylene copolymer (Vistaion 404, available from Exxon Chemical, Houston, Tex.) and low molecular weight polybutene (e.g., about 1 phr or less) (e.g., Indopol H100, available from Amoco Chemical Co., Chicago, Ill.). Providing accelerator in a premeasured mixture facilitates accurate addition of desired amounts during manufacture. In preferred examples, the cure system also includes a thiazole, which is believed to act as an accelerator and/or sulfur donor. Examples include mercaptothiazioles (e.g., CAPTAX, ROTAX, available from R.T. Vanderbilt, Norwalk, Conn.). The zinc is preferably provided as a complex with a thiazole accelerator. A preferred example is zinc 2-mercaptobenzothiazole (ZETAX available from R.T. Vanderbilt, Norwalk, Conn.). Zinc may also be provided as, e.g., elemental zinc or zinc oxide.

A cohesion enhancer can be provided to improve the cohesive strength. The cohesion enhancer contributes to the stiffness or firmness of the adhesive so that the adhesive does not become too soft, permitting a tape to which it is attached to release or "flag", when the tape is exposed to temperatures in the range of 120°–140° F., which are encountered in automobile interiors. The level of cohesion enhancer also influences adhesive properties, including unwind and adhesion to backing and steel. The cohesion enhancer is preferably provided at about 10 to 30 phr, e.g., about 15 to 25 phr. In addition, the cohesion enhancer preferably exhibits a Fogging Number of about 60 or more when measured neat in the amount present in the adhesive. A preferred cohesion enhancer is non-reactive, such as a polyolefin, preferably low density polyethylene (e.g., PE 1018 LDPE, melt index of 12.0 grams/10 minutes (ASTM D/238-62T), density 0.917 gms/10 minutes (ASTM D1505-60T) available from Chevron Chemical Co., San Francisco, Calif.). Other cohesion enhancers include medium density polyethylenes and EPDM compounds.

A tackifier may be provided to maintain and improve adhesive tack. The tackifier is preferably present at about 50 to 70, e.g., 55 to 65 phr. The tackifier preferably exhibits a Fogging Number of about 60 or more, e.g., 70 to 80, when measured neat in an amount present in the adhesive. Suitable tackifiers are hydrocarbon tackifiers include those in crystalline form (e.g., Escorez 1315 Hydrocarbon Resin aliphatic rosin 115° C. softening, (ASTM E-28), specific gravity 20°/20° C. (IPOH) 0.97 (ASTM D-71), available from Exxon Chemical Co., Houston, Tex.).

The adhesive may also include an antioxidant to retard thermal degradation (e.g., during mixing) or oxidative degradation. The antioxidant is preferably provided about 0.1 to 2.0 phr and exhibits a Fogging Number of about 60 or more, e.g., about 70 to 75, most preferably around 90, when measured neat in the amount present in the adhesive. Suitable antioxidants are amides, phenol, and peroxide-based. Preferred examples include tetrafunctional hindered phenolic antioxidants (e.g., Irganox 1010, available from Ciba- Geigy, Ardsley, N.Y.). Other suitable antioxidants include Agerite S or D (available from R.T. Vanderbilt, Norwalk, Conn.).

One or more flame retardants may also be provided. Preferably the flame retardant is present at about 20 to 60 phr, e.g., 40 to 50 phr, and exhibits a Fogging Number of about 60 or above, e.g., 70 to 90 when measured neat in an amount present in the adhesive. Suitable flame retardants include phosphorous, boron, halogen or antimony-containing compounds. A preferred flame retardant includes a mixture of antimony oxide (TMS available from ANZON, Philadelphia, Pa.) and decabromodiphenyl oxide (DE-83 available from Great Lakes Chemical, Wilmington, Del.).

A filler may be provided to improve mechanical properties during processing and in the final cured adhesive. The filler is preferably present at about 20 to 50 phr, e.g., 30 to 50 phr, and exhibits a Fogging Number of about 60 or more, e.g., 70 to 90, when measured neat in the amount present in the adhesive. Suitable fillers include mineral fillers, such as soft clay, fibrous fillers such as glass, carbon, cellulose, or aramid, or particulate fillers, including minerals, such as calcium carbonate, silica, and Woolastonite. A particularly preferred filler is McNamee clay, a hydrated aluminum silicate (available from Vanderbilt, U.S., Norwalk, Conn.).

Embodiments of the adhesives are particularly useful for harness tapes which can be made to exhibit low-fogging. Harness tapes include a backing layer, a reinforcing fiber or scrim, and the adhesive. In embodiments the tape may also include a tie coat layer between the backing and the scrim that fills the interstices between the fibers of the scrim so that the tie layer makes contact with both the backing and the adhesive. An example of a prior harness tape is provided in DeCoste Jr., U.S. Pat. No. 4,992,331, the entire contents of which is incorporated herein by reference. For low-fogging tapes, the backing, scrim, and tie layers are preferably selected for low outgassing such that the backing, scrim and tie layer collectively have a Fogging Number above 60, preferably above 70 to 80 when measured neat in the amount used.

The backing material is thin and conformable and provides heat and fluid resistance. The backing also provides improved unwind and, with the scrim, increased strength. The backing is preferably formed of a chlorinated polyethylene layer that is 1 to 3 mls. thick. The chlorinated polyethylene provides high conformability and inherent flame resistance. (Chlorinated polyethylenes (CPEs) are available commercially from, for example, Dow Chemical, Baton Rouge, La.) The backing may be from 80–100% CPE and from 0–20% by weight of a polyolefin material such as polyethylene, e.g., a low density polyethylene. Suitable backing materials are described in U.S. Pat. No. 4,992,331, incorporated supra, and in Dunhee U.S. Pat. No. 4,346,700, the entire contents of which is incorporated herein by reference.

The scrim enhances the strength characteristics of the tape, permitting tension application without substantial tape stretch during wrapping. The scrim is preferably a woven cloth formed with a synthetic fiber, such as a polyester. The scrim may include non-synthetic fibers with preferred cloths containing up to 50% cotton in the wrap direction, which facilitates evenness in tearability without sacrificing flame retardancy. Suitable scrims and cloths are described in U.S. Pat. No. 4,992,331, incorporated supra, and in Sergeant U.S. Pat. No. 4,303,724, the entire contents of which is incorporated by reference. Preferably, the scrim has 20 count in the warp direction and 10 in the fill direction.

The tie layer is selected to secure the tape constituents, including the backing, scrim, and adhesive layer. The tie layer provides a laminar product that is stable against delamination or separation. Particularly useful tie materials are polyolefin copolymers, particularly polyethylene copolymers such as ethylene methyl acrylate, ethylene vinyl acetate, ethylene acrylic acid, and the like. Suitable tie layers are described in U.S. Pat. No. 4,992,331, incorporated supra.

The preferred harness tapes, in addition to low-fogging characteristics, as described above, exhibit flexural stiffness in the range of 50 to 1000 mg.cm., more preferably about 100 to 200 mg.cm. (as measured by ASTM D-1388-64), tensile strength in the range of about 10 to 40, preferably 15 to 30 lbs/width-inch (as measured by ASTM D-1000) and adhesion to backing and polished steel of about 15 to 60 ounces, preferably 25 to 50 ounces (as measured by ASTM D-1000). The preferred harness tapes also exhibit an unwind of about 15 to 60, preferably about 25 to 50 ounces (ASTM D-1000 Method A). The tapes also exhibit a flame retardancy such that they are self-extinguishing (ASTM D-568). The preferred harness tapes are also impervious automotive fluids such as brake fluid, transmission fluid, oil, gasoline, and other liquids in a manner that the tapes do not readily deteriorate or become unglued. Fluid imperviousness is measured by Ford specification ESB-M3G-177-A, (see page 5), the entire contents of which is incorporated herein by reference and attached hereto as Appendix I.

Manufacture

The adhesive can be manufactured by combining the constituents in a high-shear mixer. The elastomer and cure system are introduced into the mixer and masticated, which softens the elastomer so that other constituents may be introduced and homogenized, and initiates curing. The remaining constituents are introduced as mixing continues. Following mixing, the composition is milled with a portion of tackifier being added. The adhesive can then be removed from the rollers and is ready for use.

For a harness tape, the backing material is coextruded with the tie layer onto a reinforcing scrim. The adhesive is applied to the scrim on a two-roll calendar nip. The gap of the nip is selected to provide an adhesive layer of desired thickness, e.g., 2 mils. The adhesive entering the rollers is then pressed against the reinforcing scrim. Further discussion of tape manufacture is provided in U.S. Pat. No. 4,992,331, incorporated supra.

Test Procedures

The fogging characteristics of the adhesive, or tape using the adhesive, can be tested using Ford Laboratory Test Method BO 116-3, entitled "Interior Trim-Fogging Characteristics" Feb. 6, 1989. The method publication is incorporated herein by reference and provided as Appendix II to this application. The Fogging Numbers reported herein are accurate to at least about ±10%. Briefly, the procedure involves the following:

1. A specimen of the adhesive or a tape employing the adhesive which is of standard size is placed inside a test chamber (Haake) at a distance from a clean glass plate of known reflectivity, as measured by a glossometer. (Gardner).

2. The chamber is heated to 100° C. for three hours while the gloss plate is maintained at about 21° C. The heating causes outgassing of constituents in the specimen which condense on the surface of the glass plate.

3. The plate is then removed from the chamber and allowed to equilibrate to room temperature.

4. The reflectivity of the plate is then measured.

5. The Fogging Number for the sample is calculated by the ratio of the final gloss meter reading to the initial gloss meter reading multiplied by 100.

The fogging contribution for a particular constituent of the adhesive or tape can be approximated by placing in the chamber an amount of the constituent (by weight) that is present in a standard size sample as described in Method B0 116-3.

Test methods for other properties, such as flexural rigidity, tensile strength, adhesion, unwind, and flame retardancy and fluid resistance are given in the procedures recited above.

EXAMPLES

The following examples further illustrate the invention.

Example 1

The following constituents were formulated into an adhesive.

ADHESIVE FORMULA

| Constituent | PHR | FOGGING NUMBER, NEAT |
|---|---|---|
| Natural Rubber (Sir 10) | 75.0 | 64.2 |
| Low Density Polyethylene (1018 LDPE) | 18.7 | 90.0 |
| Reclaimed Butyl (High Mooney Butex) | 6.3 | 79.2 |
| Methyl Tuads | 0.3 | — |
| Ethylene-propylene Copolymer (Vistalon 404) | 2.2 | — |
| Low Molecular Weight Polybutene (H100) | 0.5 | — |
| Zinc 2-mercaptobenzothiazole (Zetax) | 1.0 | — |
| Antioxidant (Irganox 1010) | 1.0 | 93.4 |
| Antimony Oxide (TMS-Anzon) | 15.0 | 93.0 |
| Decabromodiphenyl oxide (DE-83) | 30.0 | 76.3 |
| McNamee Clay | 35.0 | 86.2 |
| Hydrocarbon Resin (Escorez 1315) | 65.3 | 74.9 |
| Backing/scrim/tie layer | — | 70.0 |
| Post-Cure Fogging Number | | 92.4 |

The constituents were combined in a Banbury mixer. The elastomer and cure system are masticated for about 50 to 60 seconds. It is believed that the frictional forces generated in the mixer heats the mixture to about 250° F. A second charge was introduced that includes the antioxidant, 50% of the flame retardant, 50% of the filler, and 30% of the tackifier. The mixing continues for about 1 to 1.5 minutes after the second charge is added. A third charge containing the remaining portion of filler, antioxidant, and flame retardant was then added and mixing continued for another 1 to 2 minutes.

Following mixing, the composition was milled on a two roller milling apparatus. The remaining portion (30%) of tackifier was added in the milling step. The rollers were heated to about 200° F. and the milling continued for about 20 minutes. The adhesive was removed from the rollers and incorporated into a tape using the procedure described above.

The tape included a backing (about 2.25 mls) made of a blend of about 58% chlorinated polyethylene (Grade 4211 Dow Chemical), 37% low density polyethylene (Grade 1018, Chevron Chemical), 3% carbon black, 0.5% Irganox 1010 and 1.5% TSPP (tetrasodium pyrophosphate). The scrim was a polyester-cotton blend (75/25) with cloth count 20×10. The tie layer (about 0.25 mls) was ethylene methyacrylate copolymer (Grade 2205, available from Chevron Chemical Co.). The tape had a flexural stiffness of 160 mg.cm, a tensile strength of 20 lbs./in., an unwind of 45 oz./in., fluid resistance and flame retardancy.

The table above indicates the Fogging Numbers for the elastomer, cohesion enhancer, tackifier, and other constituents when measured neat in the approximate amounts present. The table also indicates that the tape, including the cured adhesive, exhibited a Fogging Number of about 92.

Example 2

Harness tape samples where manufactured using the techniques and materials described above, but the level/ratio of methyl tuads to zinc 2-mercaptobenzothiazole was varied. Referring to FIGURE 1, the Fogging Numbers are plotted for tape samples having a level/ratio of 0 (uncured), 0.15:0.5, 0.3:1, and 0.45:1.5.

As the data illustrates, the tapes with an adhesive including a level/ratio of about 0.15:0.5 or greater exhibit low-fogging, and tape with adhesive having a level/ratio of 0.3:1.0 exhibit a Fogging Number of over 70, well above that required by automotive manufacturers. (The Fogging Number exhibited at the 0.3:1.0 phr level/ratio in this example is below that in Example 1. This is believed to be due to experimental error and slight contamination in the mixing of the constituents.) With a level/ratio of 0.45 to 1.5, the tape exhibits a Fogging Number of over 80.

The adhesive without cure or with a low accelerator to cure system level/ratio provide a Fogging Number below 40, even though the primary constituents have generally high Fogging Numbers, above 60, when measured neat in the amounts that are incorporated in the adhesive, as illustrated in Example 1.

Example 3

The following constituents were formulated into an adhesive, using a mixture of natural rubber and sytrene isoprene rubber.

ADHESIVE FORMULA

| Constituent | PHR |
|---|---|
| Natural Rubber (Sir 10) | 60.0 |
| Styrene-Isoprene Rubber (Kraton SOLT 3602) | 40.0 |
| Reclaimed Butyl Rubber (High Mooney Butex) | 6.0 |
| Methyl Tuads | 0.3 |
| Zinc 2-Mercaptobenzothiazole (Zetax) | 1.0 |
| Antioxidant (Irganox 1010) | 1.0 |
| Antimony Oxide (TMS-Anzon) | 15.0 |
| Decabromodiphenyl oxide (DE-83) | 30.0 |
| McNamee Clay | 37.0 |
| Hydrocarbon Resin (Escorez 1315) | 68.0 |
| Fogging Number | 57.1 |

The constituents were combined in a Banbury mixer, milled, and incorporated into a tape as described above. The styrene-isoprene rubber exhibited a Fogging Number of about 75.6 when measured neat in the amount present in the adhesive. The adhesive exhibits a Fogging Number of 57.1.

Example 4

The following constituents were formulated into an adhesive, using a phenolic cure.

ADHESIVE FORMULA

| Constituent | PHR |
|---|---|
| Natural Rubber (Sir 10) | 100.0 |
| Reclaimed Butyl (High Mooney Butex) | 6.0 |
| Phenolic Curing Agent (SP-1055, Schenectady Co., | 1.25 |

ADHESIVE FORMULA

| Constituent | PHR |
|---|---|
| Schenectady, NY). | |
| Antioxidant (Irgonox 1010) | 1.2 |
| Antimony Oxide (TMS-Anzon) | 15.0 |
| Decabromodiphenyl Oxide (DE-83) | 30.0 |
| McNamee Clay | 37.0 |
| Hydrocarbon Resin (Escorez 1315) | 68.0 |
| Fogging Number | 33.6 |

The constituents were combined in a Banbury mixer, milled, and incorporated into a tape, as described above. As the results indicate, using the phenolic use produces an adhesive with a Fogging Number of about 33.

Example 5

The following constituents were formulated into an adhesive, using a mixture of natural rubber and styrene-butadiene rubber.

ADHESIVE FORMULA

| Constituent | PHR |
|---|---|
| Natural Rubber (Sir 10) | 59.0 |
| Styrene-Butadiene Rubber (SBR 1551, Ameripol Snypol, Akron, OH) | 41.0 |
| Reclaimed Butyl Rubber (High-Mooney Butex) | 6.0 |
| Methyl Tuads | 0.3 |
| Zinc 2-Mercaptobenzothiazole (Zetax) | 1.0 |
| Antioxidant (Irganox 1010) | 1.2 |
| Antimony Oxide (TMS-Anzon) | 10.0 |
| Decabromodiphenyl Oxide (Saytex) | 30.0 |
| Hydrated Alumina | 5.0 |
| McNamee Clay | 37.0 |
| Hydrocarbon Resin (Escorez 1315) | 68.0 |
| Fogging Number | 30.0 |

The constituents were combined in a Banbury mixer, milled, and incorporated into a tape as described above. The Styrene-Butadiene rubber exhibited a Fogging Number of about 22 when measured neat in the amount present in the adhesive. The adhesive exhibited a Fogging Number of about 30.

Other Uses

The low-fog adhesives can be used in applications other than harness tapes. For example, the adhesives can be used for other industrial tapes, such as masking tapes, which are generally of lower flexibility and conformability. The adhesives can also be used in other tape applications, particularly those which are used in environments where outgassing would be detrimental. The adhesives can also be used in non-tape applications. Examples include, securing automobile headliners, carpeting mastics, for use, for example in automobile and other applications.

Still further embodiments are within the following claims.
What is claimed is:

1. A low-fogging harness tape, comprising:
a backing, a reinforcing layer, and a pressure-sensitive adhesive,
said adhesive is a cured composition, comprising:
an elastomer including predominantly isoprene,
a cohesion enhancer,
a tackifier, and
a cure system comprised of zinc-containing curing agent, thiuram present at about 0.15 phr or more, and thiazole present at about 0.5 phr or more, said thiuram and said thiazole being present in a ratio of about 1:3,
said elastomer, cohesion enhancer, and tackifier having Fogging Numbers of about 60 or more when measured neat in the amounts present in said composition, and
said tape having a Fogging Number of about 50 or more following cure of said adhesive.

2. The harness tape of claim 1 having a Fogging Number of about 60 or more following cure.

3. The harness tape of claim 1 having a Fogging Number of about 80 or more following cure.

4. The harness tape of claim 1 wherein said thiuram is present of about 0.3 phr or more and said thiazole is present at about 1.0 phr or more.

5. The harness tape of claim 1 wherein said thiuram is present in a range of about 0.3 to 0.45 phr and said thiazole is present in a range of at about 1.0 to 1.5 phr.

6. The harness tape of claim 1 wherein said thiuram is methyl tuads.

7. The harness tape of claim 1 wherein said thiazole and zinc are provided as a zinc-thiazole complex.

8. The harness tape of claim 7 wherein said thiazole is zinc 2-mercaptobenzothiazole.

9. The harness tape of claim 1 wherein said elastomer is a natural rubber.

10. The harness tape of claim 1 wherein said cohesion enhancer is polyolefin.

11. The harness tape of claim 1 wherein said tackifier is a hydrocarbon resin.

12. The harness tape of claim 1 including a filler having a Fogging Number of about 60 or above when measured neat in the amounts present.

13. The harness tape of claim 8 wherein said filler is clay.

14. The harness tape of claim 1 including an organic antioxidant exhibiting a Fogging Number of about 60 or more when measured neat in an amount present in said adhesive.

15. The harness tape of claim 1 including flame retardant exhibiting a Fogging Number of about 60 or above when measured neat in an amount present in said adhesive.

16. The harness tape of claim 1 exhibiting unwind of about 20 to 50 ounces.

17. The harness tape of claim 1 exhibiting adhesion to backing of about 25 to 50 ounces.

18. The harness tape of claim 1 exhibiting a tensile strength of about 15 to 30 lbs/width-inch.

19. The harness tape of claim 1 exhibiting flexural stiffness of about 100 to 200 mg.cm.

20. The harness tape of claim 1 exhibiting fluid imperviousness.

21. A low-fogging harness tape, comprising:
a backing, a reinforcing layer, and a pressure-sensitive adhesive,
said adhesive is a cured composition, comprising:
an elastomer including predominantly isoprene,
a cohesion enhancer,
a tackifier, and
a cure system comprised of zinc-containing curing agent, thiuram present at about 0.15 phr or more, and thiazole present at about 0.5 phr or more, said thiuram and said thiazole being present in a ratio of about 1:3.

22. A low-fogging harness tape, comprising:
a backing, a reinforcing layer, and a pressure-sensitive adhesive,
said adhesive is a cured composition, comprising:

an elastomer including predominantly isoprene,
a cohesion enhancer,
a tackifier, and
a cure system comprised of zinc-containing curing agent, thiuram, and thiazole, said elastomer, cohesion enhancer, and tackifier having Fogging Numbers of about 60 or more when measured neat in the amounts present in said composition, and said tape having a Fogging Number of about 50 or more following cure of said adhesive.

23. A low-fogging harness tape, comprising:

a backing, a reinforcing layer, and a pressure-sensitive adhesive, said adhesive is a cured composition, comprising:
an elastomer including isoprene,
a cohesion enhancer,
a tackifier, and
a cure system comprised of a sulfur-containing accelerator, a sulfur-containing curing agent, and zinc, said elastomer, cohesion enhancer, and tackifier having fogging numbers of about 60 or more when measured neat in the amounts present in said composition, and said tape having a fogging number of about 50 or more following cure of said adhesive.

24. The harness tape of any one of claims 1, 21, 22, or 23 further including a flame retardant.

25. The harness tape of claim 21 wherein said tape has a fogging number of about 60 or above.

* * * * *